United States Patent
Ohnstad et al.

(10) Patent No.: US 7,854,968 B2
(45) Date of Patent: Dec. 21, 2010

(54) METHOD FOR CREATING AND APPLYING LIQUID-CONTAINER BARRIER COATING

(75) Inventors: Thomas S. Ohnstad, Salem, OR (US); Russell A. Monk, Salem, OR (US)

(73) Assignee: High Impact Technology, LLC, Tigard, OR (US)

( * ) Notice: Subject to any disclaimer, the term of this patent is extended or adjusted under 35 U.S.C. 154(b) by 0 days.

(21) Appl. No.: 12/454,243

(22) Filed: May 13, 2009

(65) Prior Publication Data

US 2009/0226625 A1  Sep. 10, 2009

Related U.S. Application Data

(60) Continuation of application No. 12/284,786, filed on Sep. 25, 2008, now abandoned, which is a division of application No. 11/413,656, filed on Apr. 27, 2006, now abandoned.

(60) Provisional application No. 60/684,244, filed on May 24, 2005, provisional application No. 60/684,245, filed on May 24, 2005.

(51) Int. Cl.
   *B05D 1/02* (2006.01)
(52) U.S. Cl. .................................. 427/421.1; 427/426
(58) Field of Classification Search ................ 427/421.1
   See application file for complete search history.

(56) References Cited

U.S. PATENT DOCUMENTS

| | | |
|---|---|---|
| 2,403,836 A | 7/1946 | Wagner |
| 2,605,138 A | 7/1952 | Paasche |
| 3,606,154 A | 9/1971 | Tufts |
| 3,664,904 A | 5/1972 | Cook |
| 3,676,197 A | 7/1972 | Harrison et al. |
| 3,698,587 A * | 10/1972 | Baker et al. ................. 428/63 |
| 4,197,092 A | 4/1980 | Bretz |
| 4,216,803 A | 8/1980 | Hall |
| 5,306,867 A | 4/1994 | Connole et al. |
| 5,472,743 A | 12/1995 | Daluise |
| 6,040,356 A | 3/2000 | Kanki et al. |
| 6,432,882 B1 | 8/2002 | Yamamoto |
| 6,803,400 B1 | 10/2004 | Butterbach et al. |
| 7,169,452 B1 * | 1/2007 | Monk et al. ................ 428/35.7 |
| 2004/0065456 A1 * | 4/2004 | Belli et al. ................ 174/25 R |
| 2005/0084334 A1 | 4/2005 | Shi et al. |

* cited by examiner

*Primary Examiner*—Timothy H Meeks
*Assistant Examiner*—Nathan T Leong
(74) *Attorney, Agent, or Firm*—Jon M. Dickinson; Robert D. Varitz

(57) ABSTRACT

A method for establishing a sprayable stream of composite material for spray-applying to a target surface to create thereon a defined composite-material coating designed for defeating a liquid leak from a puncture wound created in the wall of a container holding liquid of a particular character, where the target surface is on a side of that wall. The method includes (a) initiating a pair of respective sub-flows of two, precursor elastomeric materials intended for later blending to create a formed, elastomeric body, (b) at a point downstream from such initiating, introducing a flow of plural, liquid-imbiber beads which are reactive to the mentioned, particular-character liquid, (c) in a user-chooseable manner upstream from where such later blending takes place, merging the flow of beads with at least one of the two sub-flows of elastomeric materials, (d) following such merging, blending the two sub-flows, and (e) thereafter spray-applying the merged and blended flows/sub-flows to a target surface thus to create the desired, defined composite-material coating.

2 Claims, 3 Drawing Sheets

METHOD FOR CREATING AND APPLYING LIQUID-CONTAINER BARRIER COATING

CROSS REFERENCES TO RELATED APPLICATIONS

This application is a continuation from of U.S. patent application Ser. No. 12/284,786, filed Sep. 25, 2008 now abandoned, for "Method For Creating and Applying Liquid-Container Barrier Coating", which is a division from U.S. patent application Ser. No. 11/413,656, filed Apr. 27, 2006 now abandoned, covering an invention entitled "Method for Creating and Applying Liquid-Container Barrier Coating", an application which claims priority to the filing date, May 24, 2005, of U.S. Provisional Patent Application Ser. No. 60/684,244, covering an invention entitled "Application of Plural-Component, Self-Healing, Anti-Puncture Liquid Container Coating with Full, Pre-Flow Component Blending", and to the filing date, May 24, 2005, of U.S. Provisional Patent Application Ser. No. 60/684,245, covering an invention entitled "Coating Product-by-Process for the Anti-Puncture, Anti-Leak Protection of a Liquid Container". The disclosure contents of these prior-filed applications are hereby incorporated herein by reference.

BACKGROUND AND SUMMARY OF THE INVENTION

This invention pertains to the creation of a plural-layer barrier coating which is applied to the outside of the wall of a liquid container, such as a liquid container containing hydrocarbon fuel, for the purpose of defeating any substantial leak of fluid from that container on the occurrence of a puncture wound, such as bullet wound. For the purpose of illustration and description herein, the invention is described in conjunction with protecting a fuel-supply tank in a military fuel-supply vehicle, and further in the context of an overall protective coating which includes three layers. This environment is one wherein the invention has been found to offer particular utility, though it should be understood that the principles of the invention and all of its features may be utilized in other liquid-container protection circumstances.

Very specifically, the present invention relates to a methodology which is particularly associated with the creation, in such an overall coating, of a special composite-material layer which includes a body of high-elastomeric material in which there resides a distribution of a plurality of small, liquid-reactive, liquid-imbiber, bead-like elements, or beads, designed to react, in part, with liquid-imbibing, and resulting three-dimensional swelling, on contact with any leakage of liquid coming from a puncture wound in a protected container.

According to a preferred manner of practicing the invention, the subject composite-material layer is formed from a body of the mentioned high-elastomeric material, and specifically from such material which has resulted from the catalyzed pre-combination of two precursor elastomeric materials which, once combined and blended, react with one another chemically to cure to a final high-elastomeric material. Introduced in various, selectable, different ways into this material, before it becomes a "finalized layer" in a coating of the type described, is a measured quantity of small liquid-imbiber bead-like elements (beads) of the type generally mentioned above.

In this context, and as will be seen from the detailed description which follows below, the methodology of the invention is practicable in a number of different particular modes, each of which involves a somewhat different manner of combining the high-elastomeric and bead-like constituent elements utilized to make the intended composite-material layer. In particular, the described different modes and manners of combining these materials provides a user with an option to vary the length of time that the included imbiber beads are directly, contactively exposed to liquid elastomer material before the overall blend of materials is finally applied to a target surface to form the resulting, desired, composite-material layer. This "time-control" offering of the present invention has been found to allow for the production of differently characterized composite-material layers, wherein the liquid-imbibing and three-dimensional swelling responses of the imbiber elements, when exposed the leakage fluid, can be larger or smaller depending upon how much time elapses between the time of layer finalization, and the time of initial contactive engagement between elastomeric material and the imbiber-bead material. Very specifically, we have found that the effective aggressiveness with which the mentioned imbiber beads in a final composite-material layer respond to leakage liquid is related to the time of exposure which these elements have to liquid elastomeric material before final "curing" of the created composite-material layer. This timing control thus offers a user various options for "tailoring" an anti-leakage barrier coating's response characteristics relating to sealing against puncture-wound leakage in different, specific circumstances.

All of the features and advantages of the present invention will become now more fully appreciated as the detailed description which follows is viewed in conjunction with the several accompanying drawing figures.

DETAILED DESCRIPTION OF THE INVENTION

Figure 1:
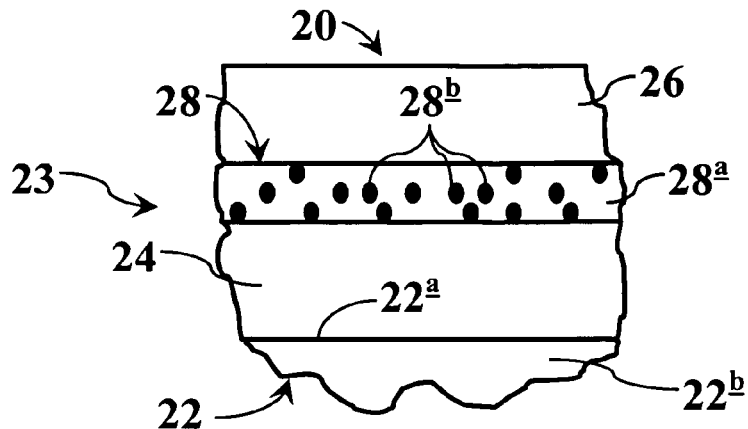
FIG. 1 is a simplified, fragmentary and schematic illustration of a leak-defeating coating applied to the outside surface of the wall in a hydrocarbon fuel container, with this coating including three layers, the central one of which is a composite-material layer that has been formed in accordance with practice of the present invention.

Turning attention now to the drawings, and beginning with FIG. 1, here there is shown generally at 20 at three-layer barrier coating which has been applied to the outside surface 22a of the wall 22b of a hydrocarbon fuel tank, or container, 22. For the purpose of describing the present invention, container 22 will be assumed to be a metallic, hydrocarbon fuel container, or tank, in a military tanker truck. Such a military "setting" is employed herein inasmuch as it provides an environment wherein practice of the present invention offers special utility. The portion of container 22 which appears in FIG. 1 is referred to herein as having a target surface 22a which lies within a target zone 23.

With respect to application to container 22 of the three layers (still to be described) of coating 20, certain "reception-surface" priming considerations are useful to have in mind, and these considerations will be mentioned later herein.

In the particular illustration of the invention now being given, coating 20 includes a pair of outer layers 24, 26, and between these two outer layers, an intermediate layer 28.

In the particular layer arrangement which is shown in FIG. 1, layers 24, 26 have a common layer thickness of about ¼-inches, and layer 28 has a layer thickness of about ⅛-inches. Layers 24, 26 are each formed from a two-part, catalyzable, high-elastomeric material made by a company named Rhino Linings USA, Inc. in San Diego, Calif., and sold under the trademark TUFF STUFF®, with one of the above-mentioned parts bearing the manufacturer's product number 60012, and the other part bearing the product number 60058. These two component parts, which are brought together and blended so as to initiate a chemical catalytic reaction to form final layers 24, 26, begin their "lives", so-to-speak, as liquid ingredients which become blended and ultimately spray-applied during the formation of coating 20. These two products, as well as the resulting catalyzed high-elastomer which they produce, are referred to herein as body-forming materials, and as precursor materials. The resulting high-elastomeric material is one which is capable of about 300% to about 400% recoverable elastic elongation.

Intermediate layer 28 is a composite-material layer which includes a main body 28a formed of the same two-part high-elastomeric material just described above with reference to the formation of layers 24, 26. Distributed within this high-elastomeric body is a plurality of hydrocarbon(fluid)-imbibing beadlike elements, or beads, 28b. These imbiber beads are made by a company named Imbibitive Technologies America, Inc. in Midland, Mich., and specifically, as illustrated herein, are formed from that company's product number IMB230300. These imbiber beads, in finished layer 28, occupy about 22% by volume of the overall layer. As will be explained shortly, composite layer 28 is also created in coating 20 by spray-application in accordance with several practice modalities contemplated by the present invention—described more fully below.

Thus, coating 20 effectively includes simply two different kinds of layers, one of which kinds is purely a high-elastomeric layer, and the other of which kinds is a composite material including a high-elastomeric body which embeds internally distributed liquid-imbiber beads. While all three of layers 24, 26, 28 are applied to create coating 20 via spraying, the present invention concerns itself only with the creation of a composite layer, like layer 28.

With respect to spray-application and creation of the several barrier-coating layers that are associated with implementation and practice of this invention, and as suggested earlier herein, a word about the use of a "receiving-surface" primer for layer adhesion assistance will be useful.

Where the receiving surface, such as surface 22a, is either metal, or painted metal, that surface should be completely dry before primer application. For an unpainted metal surface, normally no special surface texturing is necessary before primer application. However, where painted metal is involved, paint-surface profiling to produce about a 1- to about a 3-mil texture is recommended.

To such a surface, an appropriate primer, such as the so-called System 251 primer made by Rhino Linings, USA, Inc. (mentioned earlier herein), may be used. This primer preferably is applied to create a primer layer having a thickness lying in the range of about 2- to about 5-mils. Manufacturer's instructions are entirely adequate to describe both the details of applying this primer to different surfaces, and the conditions which, after primer application, should be observed to indicate readiness of the primer to receive a sprayed overlayer, such as the innermost high-elastomeric layer 24 discussed herein which lies closest to the outer surface of a protected liquid container.

After application of this innermost layer, and with regard to the recommended use or non-use of such a primer in an interlayer manner as successive barrier-coating layers, such as layers 26, 28, are sprayed into place, we have found that no primer is needed if the relevant interlayer spray interval is less than about 4-hours. If such an interval is greater than about 4-hours, primer use is recommended. The same System 251 primer may be used for such interlayer conditions.

Where the receiving surface for the innermost, barrier-coating high-elastomeric layer is the outer surface of a plastic container, such as the outer surface of an HDPE fuel tank in a military vehicle, two things preferably should be done to prepare such a surface for elastomeric layer receipt. First, the surface should be scrubbed/scuffed, as with a rotary wire cup brush, to roughen the surface, and to remove any "surface gloss" of this surface. Next, an appropriate adhesion-promoting primer should be sprayed onto the scuffed surface. A suitable primer is the two-part catalyzed product known as DPX-801 plastic adhesive primer made by PPG Industries of Strongsville, Ohio.

Interlayer primer use here should be based upon the same time-interval consideration just discussed above, and an appropriate interlayer primer is the mentioned System 251 primer.

Returning to the main description herein of the present invention, it should be understood that, while a specific barrier coating 20 has thus been illustrated and described so far herein, with this coating including three cooperative layers, an appropriate protective, anti-leakage barrier coating may include more or less layers, but always in an overall layer structure including a composite-material layer like layer 28. Further, while layers 24, 26, 28 are discussed herein as having certain specific layer thicknesses, those skilled in the art will clearly recognize that different layer thicknesses may be selected and used if desired.

Coating 20, on the occurrence of a puncture wound, as from a fired bullet, occurring in container wall 22b, reacts with several different mechanisms to close this wound, so as to defeat any major fluid leakage from container 22. Layers 24, 26 fundamentally react as elastomers which tend, through the mechanism of elastic memory, to return to the conditions which they had before such a puncture wound occurs, thus to act to close a fluid-leak passageway. These two layers also, because of the specific high-elastomeric material preferably chosen for them, and identified above, also furnish a certain amount of reaction in relation to contact with leaking liquid to absorb some of this liquid, and to swell in a manner which contributes closure pressure to a wound path that has been created. The material in these two layers also tends to engage in a certain amount of reactive congealing which further assists in closing a wound passage.

Layer 28 responds principally with the activity furnished by the distributed liquid-imbiber beads which function rapidly to absorb leaking liquid in contact with them, and to grow three-dimensionally in a manner which also greatly assists in compressively closing off a wound passage. These imbiber beads also react to leaking liquid, in this case a hydrocarbon fuel, with a kind of congealing action which further assists in sealing a liquid-leakage passageway.

Figure 2:
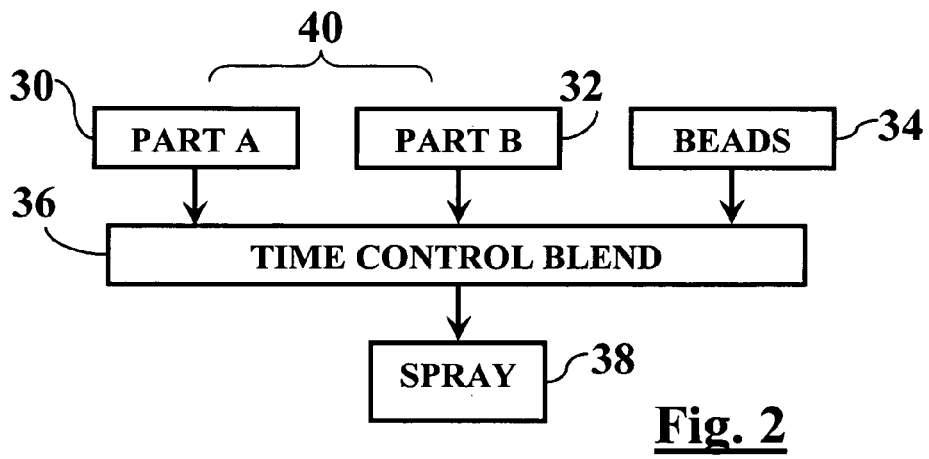
FIG. 2 is a block/schematic diagram which generally provides an overall "picture" embracing the various modalities described herein for implementing the present invention.

Turning attention now to FIG. 2 in the drawings, here there are shown schematically five blocks 30, 32, 34, 36, 38. A bracket 40 is shown overlying and spanning the space between blocks 30, 32.

Blocks 30, 32 represent starting supplies of liquid precursor parts A and B of the high-elastomer material described above and used in accordance with a preferred manner of practicing the present invention. Block 34 represents a supply of the above-mentioned imbiber beads.

Downwardly pointing arrows which extend from blocks 30, 32, 34 to block 36 reflect the general practice, in accordance with the invention, of flowing the materials "held" in blocks 30, 32, 34 to block 36 which, in broad terminology, represents various stages of time-controlled blending, mixing and merging of the liquid-elastomeric and imbiber bead components for ultimate delivery to a spraying, or spray, instrumentality which is represented by block 38. The location, or point, where the imbiber beads are introduced to the liquid elastomeric material, in all embodiments of the invention illustrated and described herein, is referred to as a selectable point which is downstream from where a flow of elastomeric liquid material is initiated. Where the liquid elastomeric material and the imbiber beads come together, in all instances, is referred to herein as the location of a merged flow. The individual flows of parts A and B elastomeric precursor materials are referred to herein as sub-flows.

As will be seen shortly, spray instrumentality 38 may, in accordance with different modified ways of practicing the present invention, take the form either of a single spray nozzle, or of a pair of such nozzles. Where a single nozzle is used, all ingredients coming from blocks 30, 32, 34 ultimately pass through this nozzle to be sprayed toward what is referred to herein as a target surface, such as target surface 22a, to create a composite-material layer, like the layer 28. Where two nozzles are used, one of these nozzles delivers a blend of the two parts (A and B) which make up the mentioned high-elastomeric material, and other nozzle handles spray delivery of the imbiber beads.

As was mentioned earlier herein, we have discovered that the length of time during which imbiber beads are in contact with still-liquid, and not yet fully cured, high-elastomeric material, has an effect on the speed with which imbiber beads, in the finally cured composite-material layer, react to leaking liquid fuel to close off leaking of that fuel. As will be observed from several practice descriptions set forth below, this discovery can be utilized effectively to allow a user to produce different kinds of composite-material layers, such as layer 28, which offer different leakage-control characteristics in such a layer. This can be accomplished by a user's choosing of the manner in which imbiber beads become introduced into the overall flow of materials which results in spray-application and creation of a composite-material layer, thus to control, with flexibility, bead exposure time to liquid elastomer material.

Still with reference to FIG. 2 in the drawings, two high-level ways of characterizing the practice of this invention may be appreciated. According to one of these ways, the invention proposes a method utilizing a spray instrumentality for spray-applying to a target surface (such as surface 22a) in a target zone (such as target zone 23) a defined composite-material layer which is to play a role in the sealing of liquid leakage from a puncture wound which has occurred in the wall of a container holding a liquid of a particular character. This method generally includes the steps of: (a) initiating a flow toward a spray instrumentality of liquid, high-elastomeric, body-forming material (blendable sub-flows of precursor elastomeric materials may be employed, as will be explained); (b) at a point downstream from where liquid-elastomer flow initiation takes place, introducing a flow of plural, bead-like, liquid-imbiber elements, or beads; (c) in a user-chooseable manner in relation to the step of introducing a flow of liquid imbiber beads, merging all of the material flows to create a combined(or composite)-material stream of sprayable, coating-forming material; and (d) following the merging step, applying the merged flows to mentioned target surface.

In a more specific sense, the invention methodology may be expressed as a method for establishing a sprayable stream of composite material for spray-applying to a target surface in a target zone to create a defined coating which is to play a role in defeating a liquid leak from a puncture wound created in the wall of a container holding liquid of a particular character, where the target surface is on a side of such a container wall, with this method including the steps of (a) initiating a pair of respective sub-flows of two, precursor elastomeric materials for later blending to create a formed elastomeric body, (b) at a point downstream from where such initiating takes place, introducing a flow of plural, liquid-imbiber beads which are reactive to the mentioned, particular-character liquid, (c) in a user-chooseable manner upstream from where such later blending takes place, merging the flow of liquid-imbiber beads with at least one of the two sub-flows of precursor elastomeric materials, (d) thereafter, blending the two sub-flows, and (e) following such merging and blending, spray-applying the merged and blended flows/sub-flows to such a target surface thus to create the desired, defined composite-material coating which takes the form of a body of elastomeric material containing a distribution of the mentioned liquid-imbiber beads.

Another high-level way to think about the methodology of the present invention is to view it generally as just above stated, with the further understanding that this methodology also includes offering a user the option of determining where the merging step takes place, thus to enable selective variation of the time interval between (a) the time of first contactive engagement of imbiber beads with liquid elastomeric material, and (b) the time of ultimate spray engagement with a target surface of the blended combination of liquid elastomeric material and imbiber beads.

Figure 3:
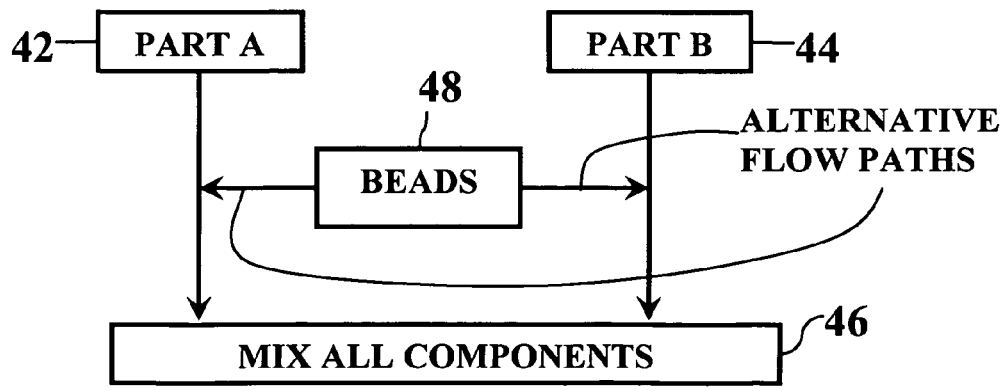
FIGS. 3 and 4 furnish two different block/schematic views regarding two different practices of the invention, wherein the merging of particular material flows, in accordance with practice of the invention, occurs at a location which is upstream from where a material blending step is performed.
Figure 4:
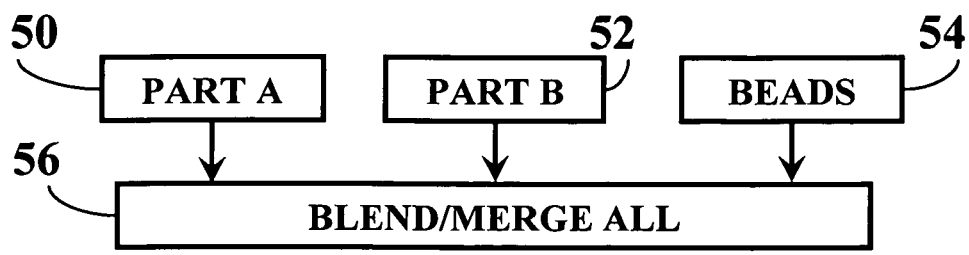

Turning attention next to FIGS. 3 and 4, these two figures illustrate two different modalities for implementing the invention in a manner whereby merging of the imbiber beads with liquid elastomeric material takes place at a location which is upstream from where the two precursor parts A and B of liquid elastomeric material are brought together and blended.

In FIG. 3, four blocks, 42, 44, 46, 48 illustrate one of these modalities. As shown here, each of the two precursor parts of liquid elastomer, represented by blocks 42, 44, is flowed directly and independently to block 46 wherein all component blending takes place. The imbiber beads, represented by block 48, are introduced to either one, but not both, of these two elastomeric-part flows en route to block 46.

The practice modality illustrated in FIG. 4 is shown in four blocks labeled 50, 52, 54, 56. As illustrated in this figure, all of the ingredients which go into the make-up of composite-material layer 28 are merged and blended substantially simultaneously, as is represented by block 56.

As will be observed from a simple comparison of the approaches illustrated respectively in FIGS. 3 and 4, and understanding that from block 46 in FIG. 3, and from block 56 in FIG. 4, the fully merged and blended materials are fed to the appropriate downstream spray instrumentality for spray application as described, the imbiber beads spend a longer time contactively exposed to liquid elastomeric material in the approach of FIG. 3 than they do in the approach of FIG. 4. More will be said about this time difference shortly.

Figure 5:
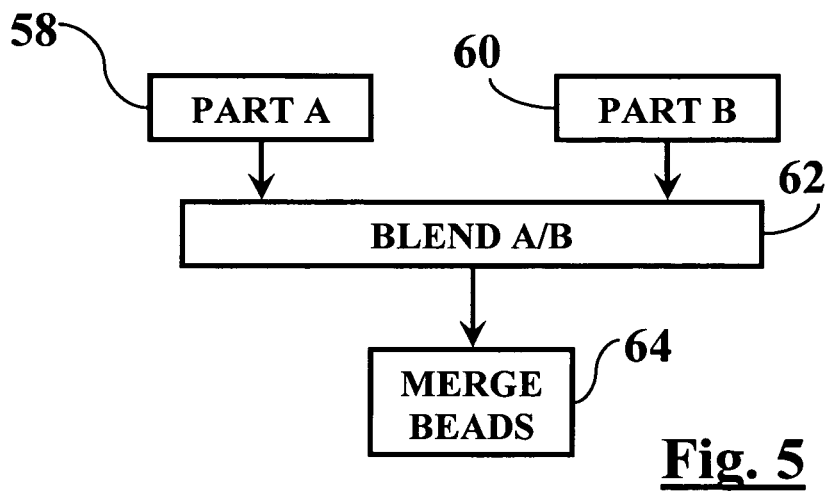
FIG. 5 is a block/schematic diagram illustrating a modified form of practicing the invention wherein the just-mentioned merging step is performed at a location which is downstream from the mentioned blending step.

FIG. 5 in the drawings illustrates another approach for implementing the practice of the present invention, and very specifically for implementing a practice wherein imbiber beads are merged into to an already blended mixture of precursor parts A and B of the high-elastomeric material. This modality is clearly pictured schematically in FIG. 5 in the four blocks which are shown at 58, 60, 62, 64. Blocks 58, 60 represent supplies from which flows of the two component parts, A and B, of the elastomeric material are drawn for supply to an appropriate blending instrumentality which is represented by block 62. Downstream from where elastomeric component blending takes place, and in a flow stream of the blended elastomeric components, imbiber beads are merged in block 64 after which this merged flow of all components is delivered to an appropriate spray instrumentality from which the requisite layer-application spray is created and directed toward the subject target surface.

By making a simple comparison of what is shown in FIG. 5, with respect to what is shown in FIG. 4, for example, one will note that the amount of time that imbiber beads spend in contact with liquid elastomeric material in the approach of FIG. 4 is longer than the time of such contactive engagement in the practice illustrated in FIG. 5.

Figure 6:
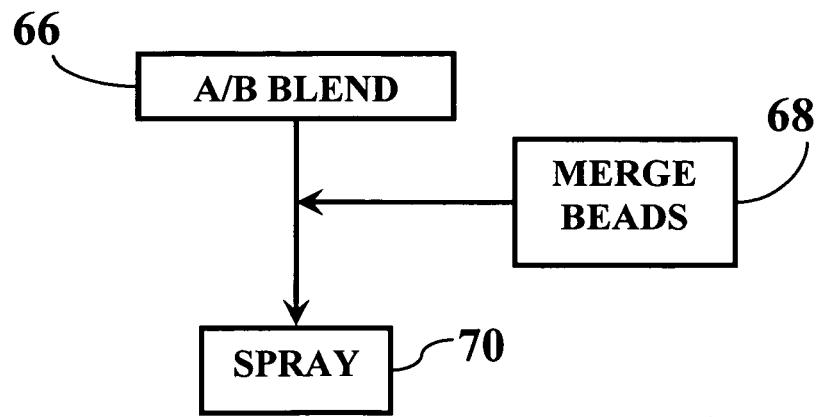
FIGS. 6, 7 and 8 are block/schematic diagrams each illustrating a different specific manner for implementing, fundamentally, the view of the invention generally pictured in FIG. 5.
Figure 7:
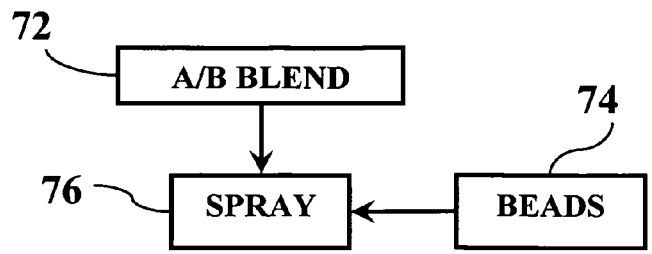
Figure 8:
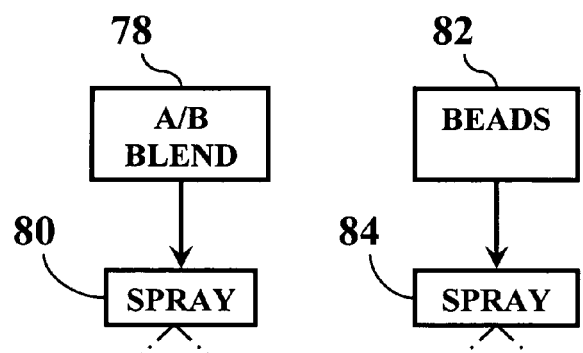
Figure 9:
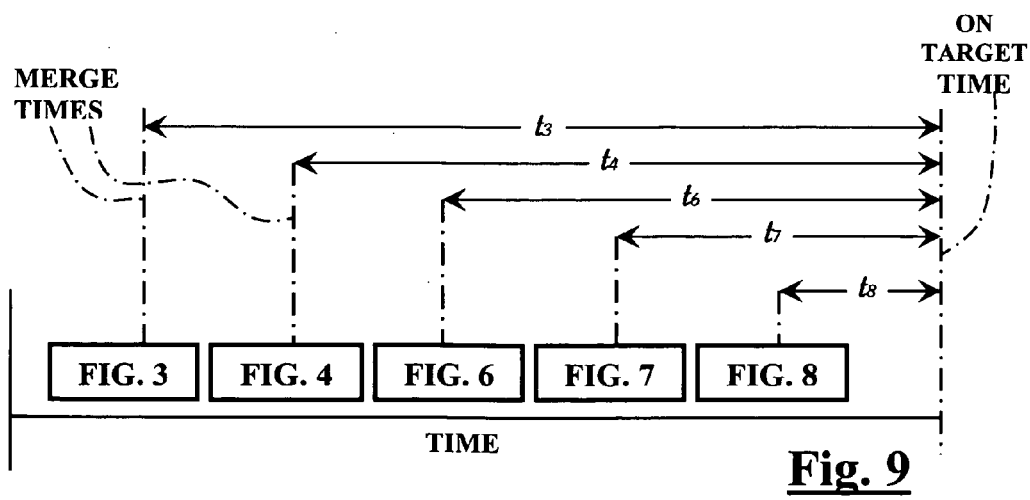
FIG. 9 furnishes a timing diagram which illustrates how different practices of the invention provide a user with options to vary the length of time that liquid-imbiber beads are contactively exposed to high-elastomeric material with the latter still in a liquid condition.

FIGS. 6, 7, and 8 illustrate three different ways more specifically of implementing the practice methodology shown in FIG. 5, namely, a methodology wherein imbiber-bead merging takes place downstream from where elastomeric-part blending occurs. In the practice pictured in FIGS. 6 and 7, imbiber beads are merged into a blended elastomeric flow stream upstream from the output side of whatever spray instrumentality is used. In FIG. 6 the merger of these beads takes place truly upstream from the spray instrumentality per se. In FIG. 7, merger occurs directly within the spray instrumentality itself.

In FIG. 8, imbiber-bead merging occurs downstream (in air) from the spray instrumentality, which, in this case, takes the form of a pair of spray devices.

Focusing for a moment specifically on FIG. 6, the practice pictured here is illustrated in three blocks 66, 68, 70. According to what is shown in FIG. 6, following appropriate blending of the two component parts of the elastomeric material, as represented by block 66, a flow thereof is directed toward an appropriate spray instrumentality represented by block 70. Merged into this flow from block 68 are liquid-imbiber beads of the type mentioned above.

In FIG. 7, three blocks 72, 74, 76 illustrate another practice of the present invention wherein a blend of the two elastomeric parts, represented by block 72, is caused to flow directly to an appropriate spray instrumentality, represented by block 76. An independent flow of imbiber beads, represented coming from block 74, is also flowed directly to the same spray instrumentality. Within this spray instrumentality, the beads and the elastomeric material blend are merged, and the merged result is ejected as a spray from instrumentality 76.

As between the two modalities represented in FIGS. 6 and 7, it will be apparent that imbiber beads have a longer contact time with liquid elastomeric material in the FIG. 6 approach than they do in the FIG. 7 approach. As is true with all of the practice modalities described so far herein, in any suitable manner, a final output spray blend/mixture is one which, in a finished layer 28, will result in the distributed imbiber beads occupying about 22% by volume of the finished layer, with the elastomeric material accounting for the balance of the layer.

FIG. 8, in blocks 78, 80, 82, 84 illustrates still another manner of practicing the invention wherein blended elastomer material and imbiber beads are merged downstream from where elastomeric component-part blending takes place. Very specifically, final merging of the elastomeric material and the liquid-imbiber beads takes place in the air in the region shown generally at 86 in FIG. 8 where elastomeric-material spray from a spray device 80 merges with an imbiber-bead spray coming from a spray device 84. Thus, according to this practice of the invention, final merging of imbiber beads and elastomeric material takes place in the air as the two sprays just mentioned merge on their way toward the appropriate target surface for the formation of a layer like layer 28.

Exactly how merging of the two sprays in region 86 takes place will depend upon user selection regarding relative positioning of the employed, two spray devices 80, 84. For example, these spray devices may be offset laterally differently, and may also be offset with respect to their respective distances from the target surface.

With respect to all of the modalities thus described in relation to practicing the present invention, the exact details of how spraying takes place, i.e. spray velocity, spray volume per unit time, spray temperature, etc. are details which are fully selectable by a user, with these details not forming specifically any part of the present invention. For example, application and use instructions provided by the makers of the high-elastomeric and liquid-imbiber bead materials may be followed as appropriate guidelines for implementing the ultimate combined material spray proposed by the present invention.

With respect to the three implementation modalities pictured in FIGS. 6, 7 and 8, it will be apparent that practice of the invention in accordance with FIG. 8 results in the imbiber beads being contactively exposed to liquid elastomeric material for the shortest time period.

Turning finally to FIG. 9 in the drawings, here is shown a timing diagram which generally relates the different lengths of times of imbiber-bead/elastomeric-material contact according to the several practices described for implementation of the present invention. Blocks labeled with related, other drawing-figure numbers are displayed along a time axis in this figure, with the relevant times of imbiber-bead contact exposure with elastomeric material being represented by timing markers $t_3$, $t_4$, $t_6$, $t_7$ and $t_8$.

The unique methodology of the present invention, expressed in the forms of several approaches, has thus been described with respect to the creation of a plural-layer barrier coating, and in particular, to the creation of a special, composite-material layer therein which includes a body of high-elastomeric material in which there resides a distribution of a plurality of small, liquid-reaction, liquid-imbiber, bead-like elements. The methodology of the invention focuses upon specific manners in which a two-part, catalytic-reaction high-elastomeric material becomes blended with a flow of an appropriate quantity of liquid-imbiber beads, to create such a composite-material layer. As the various methodologic approaches which characterize the invention clearly point out, a user, in accordance with practice of the invention, is offered an option effectively to control the manner in which these beads perform (respond) in a final composite-material layer by controlling the length of time that elapses between when an initial flow of beads makes contact with liquid elastomer material to the time when the blend of all materials has been applied to a target surface and finally cures (at about the same moment in time) to "doneness". It is this time span which plays an important role in offering a user the kind of varying-response controls just mentioned.

In one manner of describing the invention, the method thereof includes, as steps, (a) initiating a flow of liquid, high-elastomeric body-forming material toward a selected spray instrumentality, (b) at a selectable point downstream from where this initiating step takes place, introducing a flow of plural, bead-like, liquid-imbiber elements which are relevant to the character of the liquid in the container from which leakage is to be addressed, (c) in a user-chooseable manner in relation to the introducing step, merging the two mentioned material flows, and (d) following the merging step, applying the merged flows to a target surface thus to create a desired, defined, composite-material layer which takes the form of a body of high-elastomeric material containing a distribution of the mentioned liquid-imbiber elements.

Another way of expressing the methodology of the invention is to describe it as including the steps of (a) initiating a flow toward a selected spray instrumentality of liquid, high-elastomeric body-forming material, (b) at a selectable point downstream from where the initiating step takes place, introducing a flow of plural, bead-like, liquid-imbiber elements which are relevant to the character of the liquid contained in a to-be-protected container, (c) in a user-chooseable manner in relation to the introducing step, merging the two material flows, (d) following the merging step, applying the merged flows to the target surface, thus to create a desired, defined, composite-material layer which takes the form of a body of high-elastomeric material containing a distribution of the liquid-imbiber elements, and (e) in relation to the merging and applying steps, offering a user the option, regarding where the merging step takes place, effectively to vary the time between the time of performance of the merging step and the time of performance of the applying step.

Accordingly, while a preferred manner of practicing the present invention has been described and illustrated herein, with a number of practice variations also elaborated and illustrated, it is appreciated that those skilled in the art may well perceive how other variations and modifications may be made in the implementation of the invention which will nonetheless come within the scope of the following claims.

We claim:

1. A method for establishing a sprayable stream of composite material for spray-applying to a target surface in a target zone to create a defined coating which is to play a role in defeating a liquid leak from a puncture wound created in the wall of a container holding liquid of a particular character, where the target surface is on a side of such a container wall, said method comprising initiating a pair of respective sub-flows of two, precursor elastomeric materials for later blending to create a formed elastomeric body, at a point downstream from where said initiating takes place, introducing a flow of plural, liquid-imbiber beads which are reactive to the mentioned, particular-character liquid, in a user-chooseable manner upstream from where said later blending takes place, merging the flow of liquid-imbiber beads with at least one of the two sub-flows of precursor elastomeric materials, wherein said introducing includes introducing to provide a time-dependant contact interval between the liquid-imbiber beads and a sub-flow for ultimately controlling the speed with which the liquid-imbiber bead-containing composite material reacts to the particular-character liquid, thereafter, blending the two sub-flows, and following said merging and blending, spray-applying the merged and blended flows/sub-flows to such a target surface thus to create the desired, defined composite-material coating which takes the form of a body of elastomeric material containing a distribution of the mentioned liquid-imbiber beads.

2. The method of claim 1, wherein said merging takes place with respect to one only of the mentioned, two sub-flows of precursor elastomeric materials.

* * * * *